(12) United States Patent
Bruck et al.

(10) Patent No.: US 9,359,897 B2
(45) Date of Patent: Jun. 7, 2016

(54) METHOD FOR BUILDING A GAS TURBINE ENGINE COMPONENT

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 57 days.

(21) Appl. No.: 14/460,633

(22) Filed: Aug. 15, 2014

(65) Prior Publication Data
US 2016/0045989 A1   Feb. 18, 2016

(51) Int. Cl.
| | | |
|---|---|---|
| *B23K 9/04* | (2006.01) | |
| *F01D 5/00* | (2006.01) | |
| *B23K 26/06* | (2014.01) | |
| *B23K 26/34* | (2014.01) | |
| *B23K 15/00* | (2006.01) | |
| *B23P 6/00* | (2006.01) | |

(52) U.S. Cl.
CPC ............ *F01D 5/005* (2013.01); *B23K 15/0086* (2013.01); *B23K 15/0093* (2013.01); *B23K 26/0626* (2013.01); *B23K 26/082* (2015.10); *B23K 26/34* (2013.01); *B23K 26/345* (2013.01); *B23P 6/007* (2013.01); *B23K 2201/001* (2013.01); *B23K 2203/26* (2015.10)

(58) Field of Classification Search
CPC .............. B23K 26/345; B23K 25/005; B23K 26/0807; B22F 3/1055; B33Y 10/00
USPC ............... 219/73.21, 121.63, 121.64, 121.66, 219/121.73, 121.77
See application file for complete search history.

(56) References Cited

U.S. PATENT DOCUMENTS

| | | | |
|---|---|---|---|
| 3,448,241 A | 6/1969 | Buckingham | |
| 3,627,979 A | 12/1971 | Quaas | |
| 4,331,857 A | 5/1982 | Crisci | |
| 4,741,974 A | 5/1988 | Longo | |
| 4,818,562 A | 4/1989 | Arcella et al. | |
| 4,903,888 A * | 2/1990 | Clark | B23K 9/046 219/121.45 |
| 5,372,861 A * | 12/1994 | Kerrand | C23C 4/12 427/556 |
| 5,438,441 A * | 8/1995 | Rockstroh | G02B 5/32 219/121.6 |
| 5,701,669 A | 12/1997 | Meier | |
| 6,532,656 B1 * | 3/2003 | Wilkins | B23K 31/02 29/402.13 |
| 6,539,620 B1 | 4/2003 | Smashey | |
| 6,750,430 B2 | 6/2004 | Kelly | |
| 6,916,387 B2 | 7/2005 | Lulofs | |
| 7,653,995 B2 | 2/2010 | Morin | |
| 2006/0248718 A1 | 11/2006 | Szela et al. | |
| 2007/0003416 A1 | 1/2007 | Bewlay et al. | |

(Continued)

FOREIGN PATENT DOCUMENTS

JP      2009006509 A  *  1/2009

*Primary Examiner* — Thien S Tran

(57) ABSTRACT

A method, including: providing a layer of powder material (156) on a substrate (130); and traversing an energy beam (15) across the layer of powder material to form a cladding layer (10), wherein the cladding layer forms a layer of an airfoil. The traversing step includes: starting a first path (40) and a second path (44) of traversal of the energy beam from a common initiation point (48); forming a portion (60) of a first side wall (18) of the cladding layer and a first rib section (24) by traversing the energy beam along the first path and concurrently forming a portion (62) of a second side wall (16) of the cladding layer by traversing the energy beam along the second path; and creating not more than one initiation point (72, 96, 118) for each rib section (24, 26, 28) in the cladding layer.

19 Claims, 6 Drawing Sheets

(56) References Cited

U.S. PATENT DOCUMENTS

| | | | |
|---|---|---|---|
| 2007/0007260 A1* | 1/2007 | Steinhardt | B23P 6/007 219/121.64 |
| 2009/0246031 A1* | 10/2009 | Rose | B23K 9/044 416/223 R |
| 2012/0181255 A1 | 7/2012 | Bruck | |
| 2013/0136868 A1 | 5/2013 | Bruck et al. | |
| 2013/0140278 A1 | 6/2013 | Bruck et al. | |
| 2014/0072438 A1 | 3/2014 | Bruck et al. | |
| 2014/0099476 A1 | 4/2014 | Subramanian et al. | |

* cited by examiner

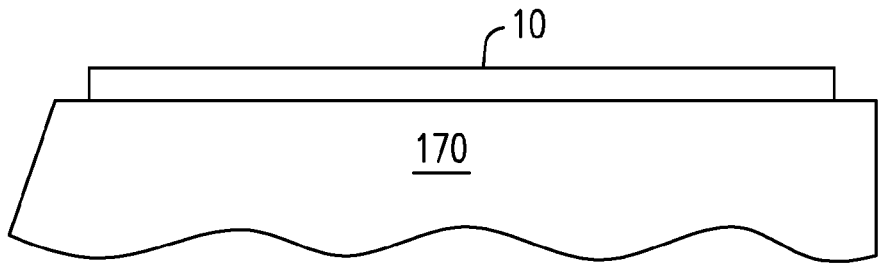
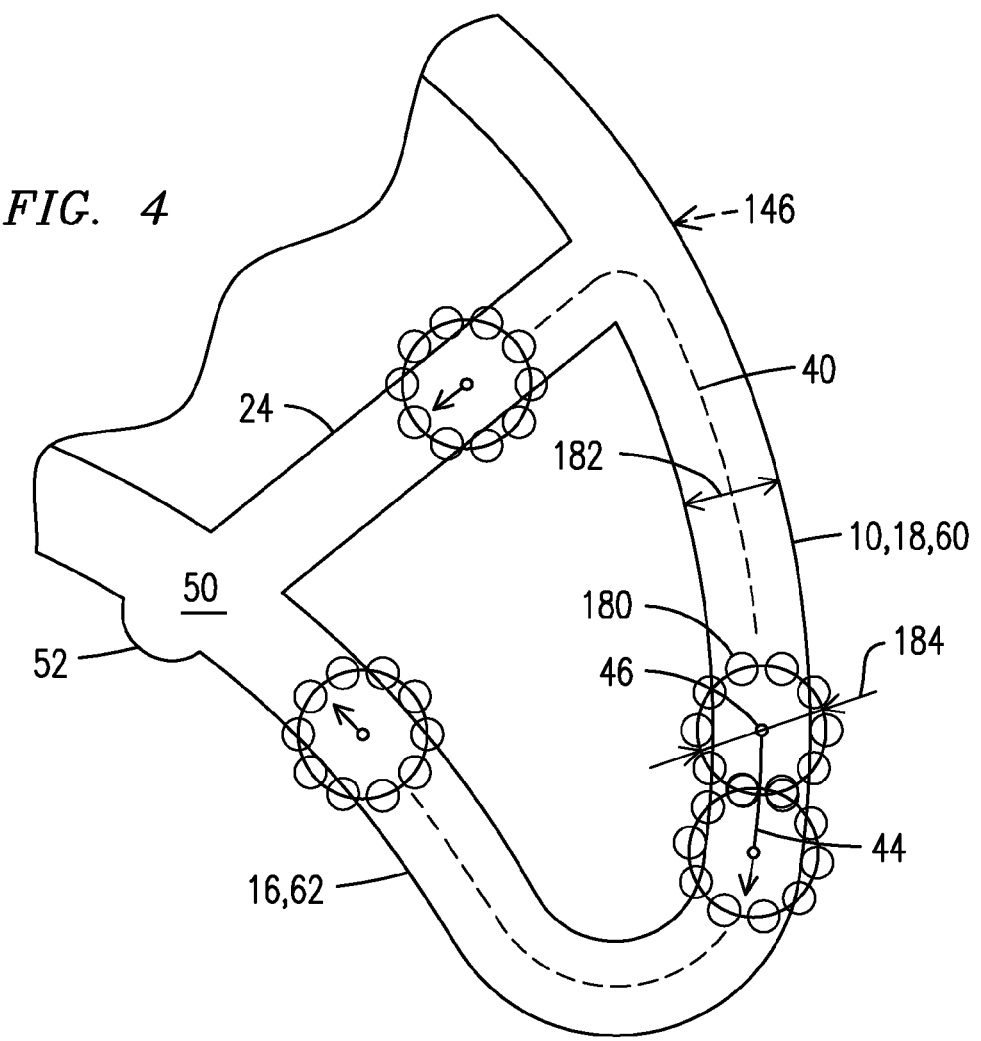

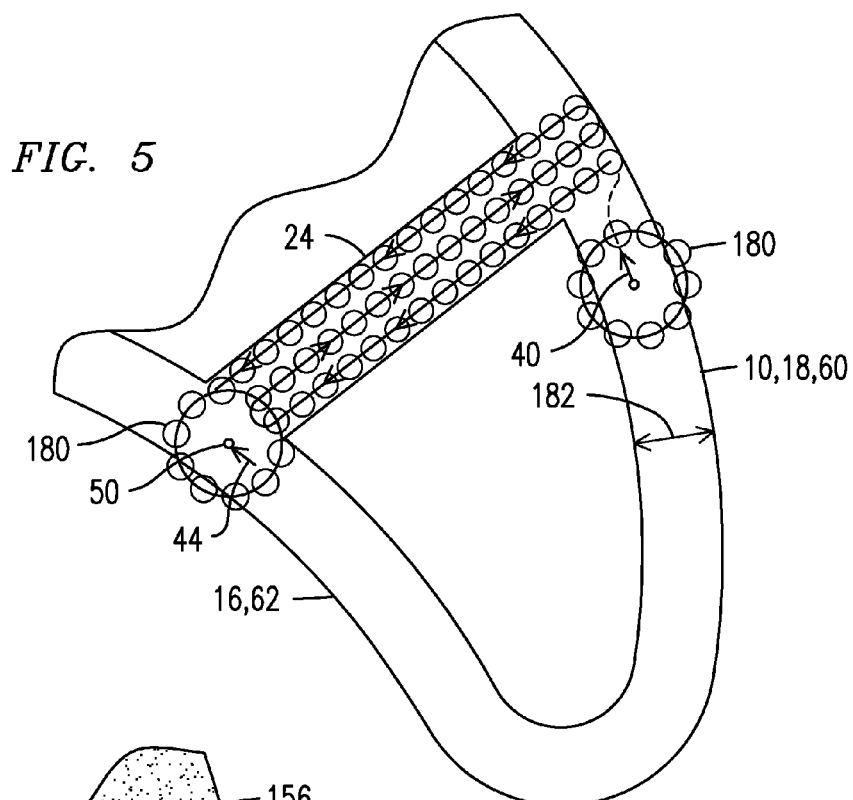
FIG. 5
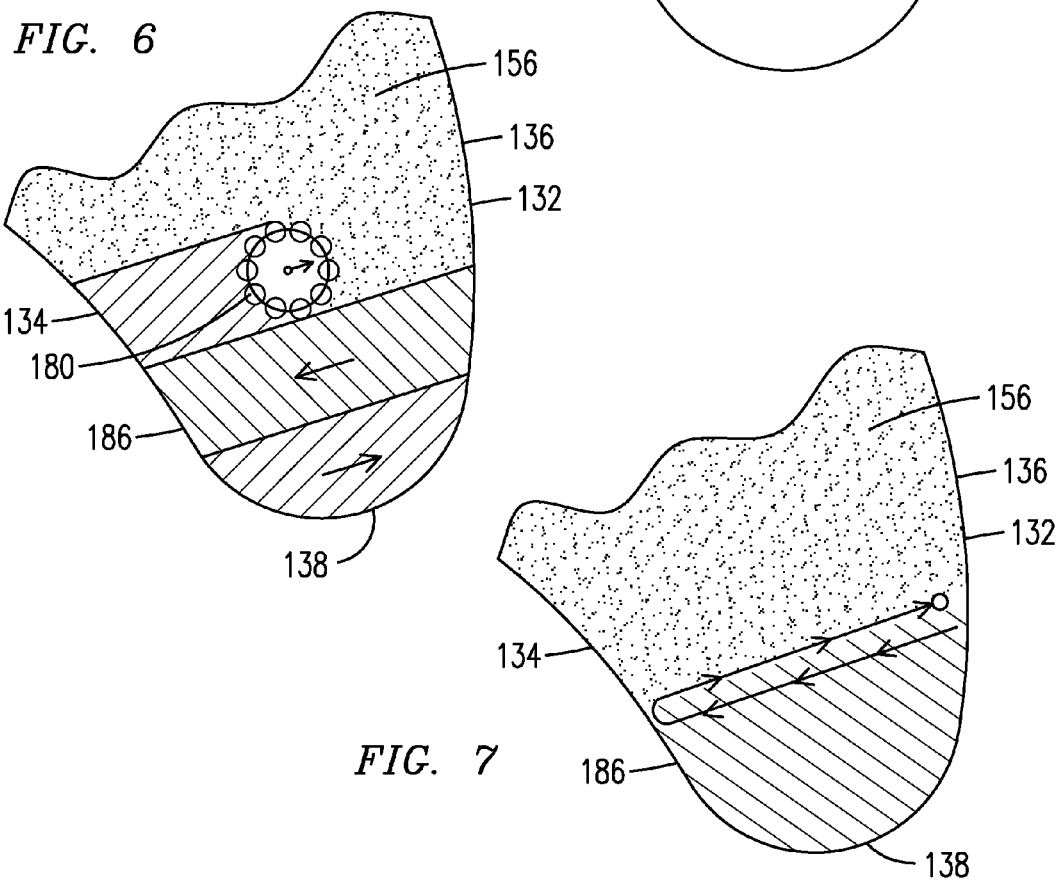
FIG. 6
FIG. 7

METHOD FOR BUILDING A GAS TURBINE ENGINE COMPONENT

FIELD OF THE INVENTION

The invention relates to building up an airfoil by depositing cladding layers using an energy beam and control optics. In particular, the invention relates to a pattern of paths along which the energy traverses while forming each cladding layer.

BACKGROUND OF THE INVENTION

Blades used in the turbine section of gas turbine engines are exposed to combustion gases, high mechanical force, and foreign object impact. This, coupled with the high operating temperature, create high levels of stress in the blade. Blade tips including blade tip shelves (an end piece of the airfoil) and blade squealers (elevated material surrounding the blade tip), blade airfoil sections, and the blade platform are particularly susceptible to stress related damages, including areas of wear and cracks. These cracks may extend from the tip of the airfoil downward toward the platform, sometimes extending past the blade shelf (also known as tip cap) adjacent the blade tip.

It is known to replace worn or cracked blade squealers with non-structural replacement material. This replacement material is considered non-structural primarily because the stresses are relatively low in this location, and as a result, consequences of damage are relatively minimal in terms of performance. Unfortunately, cracking is very often found below (toward the platform) the tip shelf, extending into the airfoil body. For example, the cracks may extend 30 mm below the blade tip. Replacement of this material (below the squealer) is more difficult and must be considered to be of a more structural requirement, wherein certain minimum mechanical properties must be attained in order to sustain the greater stresses encountered in the airfoil body.

For the most difficult to weld superalloys, there is no known process to replace such extensive portions of a turbine blade. Grinding out and re-welding cracks using a hot box to maximize material ductility during the process has met with limited success. Cutting off the entire distressed blade tip and welding is not possible for at least two reasons. First, the material itself does not accommodate butt welding. It would crack due to shrinkage stresses and high restraint. Second, ribs disposed within the airfoil (serving structural function and cooling air management) could not be accessed for butt welding. Consequently, there is room in the art for improved methods of building and/or repairing blade airfoils.

BRIEF DESCRIPTION OF THE DRAWINGS

The invention is explained in the following description in view of the drawings that show:

FIG. 3 is a schematic side view of the cladding layer of FIG. 1 on an alternate substrate.

FIGS. 4-5 schematically show exemplary embodiments of patterns followed by the energy beam when forming the cladding layer, where the patterns are superimposed on the cladding layer.

FIGS. 6-7 schematically show exemplary embodiments of patterns followed by the energy beam while forming exemplary embodiments of a blade tip.

DETAILED DESCRIPTION OF THE INVENTION

The present inventors have devised a method of building up an airfoil section of a gas turbine component having an airfoil skin structurally supported by internal ribs, such as a turbine blade, by depositing layers of cladding on a substrate using scanning optics. The scanning optics generate two melt pools in a layer of powder material placed on the substrate, and the two melt pools simultaneously travel along different paths to form each cladding layer. Each cladding layer forms a layer of the airfoil and includes side sections and at least one rib section. Each melt pool forms a different side of the cladding layer to prevent warping of the blade. One of the melt pools forms each rib section, and for each rib section there is not more than one path start. This combination of features enables building up of new airfoil sections and repair of existing airfoil sections in a manner not previously possible.

In an exemplary embodiment where the substrate is a superalloy, the powder material may include a superalloy metal powder and a flux as described in U.S. patent publication number 2013/0140278 to Bruck et al. and incorporated in its entirety by reference herein. The ability to clad superalloys in this manner, together with the advanced scanning optics now available (e.g. Cambridge Technology Lightning II 4 kW, Scanlab powerSCAN 4 kW, Trumpf PFO 3D 8 kw and IPG 8 kW), and the deposition pattern disclosed herein enables buildup and repair of superalloy components that was not previously possible.

Figure 1:
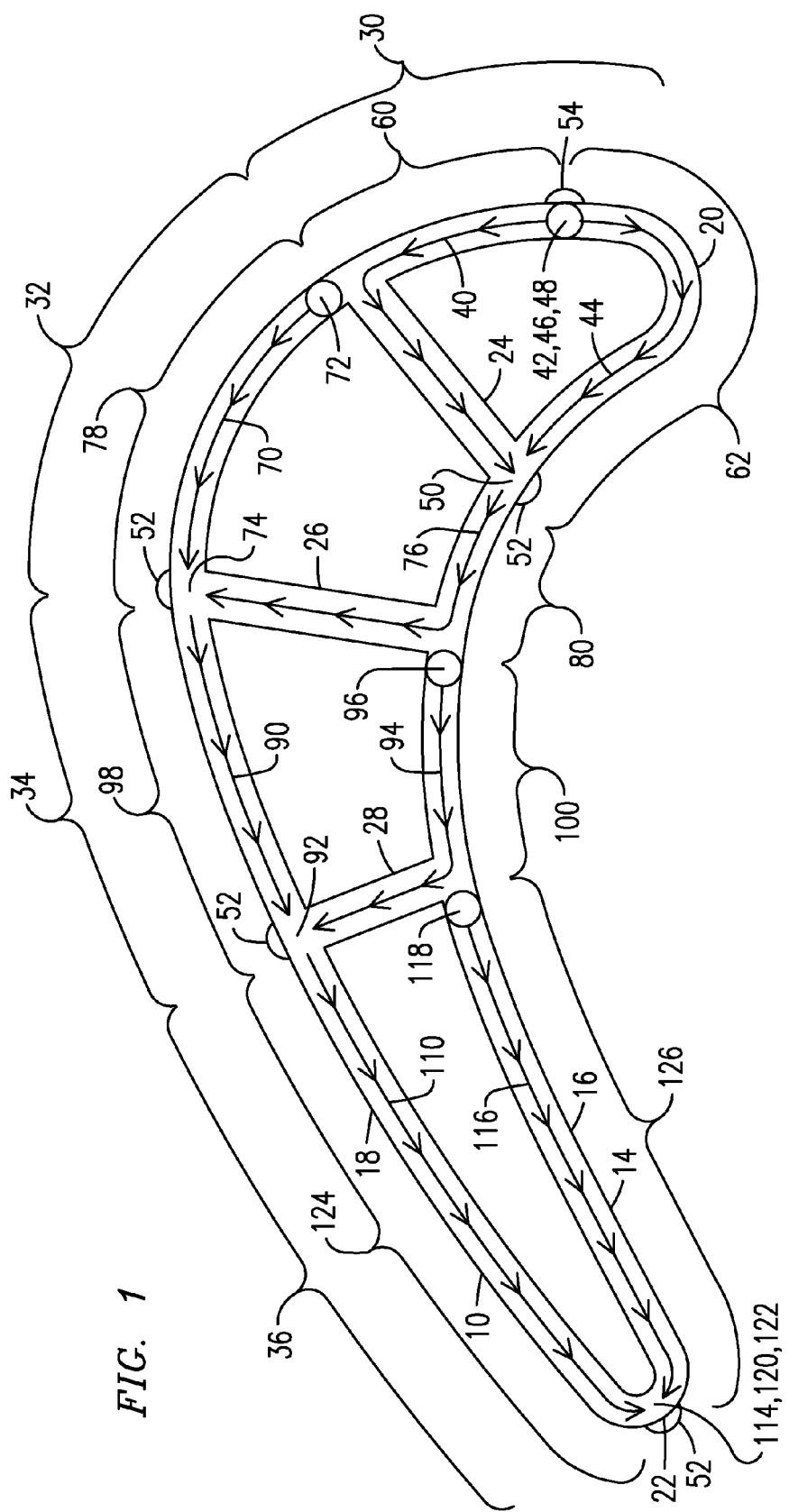
FIG. 1 schematically shows an exemplary embodiment of paths followed by an energy beam when forming an exemplary embodiment of a cladding layer, where the paths are superimposed on the cladding layer.

FIG. 1 schematically shows an exemplary embodiment of paths followed by an energy beam when forming an exemplary embodiment of a cladding layer 10, where the paths are superimposed on a substrate (not visible). The cladding layer 10 may be in the shape of an airfoil and have a skin 14 having a pressure side wall 16, a suction side wall 18, a leading edge 20, a trailing edge 22, a first rib section 24, a second rib section 26, and a third rib section 28. (Any number of rib sections is within the scope of the disclosure, from one up.) To form the cladding layer 10 a powder material (not shown) is placed on the substrate and the energy beam (not shown) is activated and traverses the paths shown by the arrows.

The cladding layer 10 may be considered to include several portions. In this exemplary embodiment there may be a first portion 30 that includes the first rib section 24, a second portion 32 that includes the second rib section 26, a third portion 34 that includes the third rib section 28, and a fourth portion 36 that includes the trailing edge 22. A pair of paths may be used to form each portion of the cladding layer 10.

To form the first portion 30 a first path 40 may start at a first path initiation point 42 on a leading edge side of the first rib section 24 and traverse along the suction side wall 18 and then turn to form the first rib section 24. A second path 44 may start at the second path initiation point 46 on a leading edge side of the first rib section 24 and traverse along the pressure side wall 16. The first path initiation point 42 and the second path initiation point 46 may be located at a common initiation point 48. There may be an optional disposable runon tab 54 provided adjacent to any of the initiation points, such as at the common initiation point 48. The first path 40 and the second path 44 meet at a junction 50 where the first rib section 24 meets the pressure side wall 16.

The location of the common initiation point 48 may be selecting so that a length of the first path 40 and a length of the second path 44 are the same. In such an exemplary embodiment the scanning optics may be configured to traverse the energy beam along each path at the same rate, thereby taking the same amount of time for the energy beam to traverse the first path 40 as the second path 44. Alternately, the first path 40 and the second path 44 may be of different lengths. In this case it may take more time to form the longer path if the energy beam traverses each path at the same rate. When the two paths are of differing length but the traversal rate is the same for each path, the scanning of the energy beam can be still adjusted so that it traverses each path in the same amount of time. For example, if the first path 40 is twice as long as the second path 44, then the energy beam may spend twice the time forming the first path 40 as the second path 44, while traversing each path at the same rate. This is made possible because the melt pool of the shorter path will remain liquefied long enough to permit the energy beam to spend more time forming the longer path, even if the power output of the energy beam is the same when forming each path.

When forming the cladding layer 10 a first melt pool (not shown) would follow the first path 40 and a second melt pool (not shown) would follow the second path 44. If one of the melt pools were to be initiated and the powder material at the common initiation point melted and then solidified before the other melt pool was initiated, then the solidified material at the common initiation point 48 would be remelted by the melt pool that initiated later in time. This remelting (remelt) can be avoided by starting both melt pools at the same time, or close enough in time that only one melt pool (not shown) is formed at the common initiation point 48. Avoiding remelt reduces the possibility for cracking and creates a stronger cladding layer.

If one of the melt pools were to be terminated at the junction 50 where the first rib section 24 meets the pressure side wall 16 and allowed to solidify before the other melt pool reaches the junction 50, then the solidified material at the junction would be remelted by the melt pool that arrived later in time. This remelting can be avoided by merging both melt pools into a single melt pool at the junction 50. An optional disposable runoff tab 52 may be positioned at the junction 50, or at any point where a path is to end. Any runoff tabs 52 may be machined off after the cladding layer 10 is completed.

At this point in the process the first portion 30 of the cladding layer 10 is formed. The first path 40 formed a portion 60 of the suction side wall 18 of the cladding layer 10 and the first rib section 24. The second path formed a portion 62 of the pressure side wall 16 of the cladding layer 10.

To form the second portion 32 a third path 70 may start at a third path initiation point 72 and the energy beam traverses a melt pool along the third path 70 to form more of the suction side wall 18 until it reaches a junction 74 where the suction side wall 18 meets the second rib section 26. It is possible that cladding material in the portion 60 of the suction side wall 18 adjacent the third path initiation point 72 will have solidified. Consequently, it is possible that there may be some remelt at the third path initiation point 72.

A fourth path 76 may start at the junction 50 where the first rib section 24 meets the pressure side wall 16, and the energy beam causes a melt pool to form more of the pressure side wall 16, and forms the second rib section 26, after which it meets the melt pool that traversed the third path 70. In an exemplary embodiment the melt pool formed by the energy beam traversing the fourth path 76 may start before melted material in the first portion 30 at the junction 50 solidifies. In such an embodiment there is no remelting of the material of the cladding layer 10 at the junction 50 where the first rib section 24 meets the pressure side wall 16.

The melt pool that traverses the third path 70 may be timed to meet with the melt pool that traverses the fourth path 76 such that they unite into a single melt pool at the junction 74, which avoids remelt of the cladding material at the junction 74. To accomplish this, the start times for the melt pool that traverses the third path 70 may be delayed with respect to the melt pool that traverses the fourth path 76. Alternately, the traversal rates may be varied, or the energy beam may maintain the same traversal rates but spend more time on the fourth path 76. An optional, disposable runoff tab 52 may be positioned at the junction 74 and one or more melt pools may be run off at the runoff tab 52. Consequently, in this exemplary embodiment there is only one remelt in the second portion 32 for the first rib section 24.

At this point in the process the second portion 32 of the cladding layer 10 is formed. The third path 70 formed a portion 78 of the suction side wall 18. The fourth path 76 formed a portion 80 of the pressure side wall 16 and the second rib section 26.

To form the third portion 34, a fifth path 90 may start at the junction 74 where the suction side wall 18 meets the second rib section 26. The energy beam causes a melt pool to form more of the suction side wall 18 until it reaches a junction 92 where the suction side wall 18 meets the third rib section 28. In an exemplary embodiment the melt pool formed by the energy beam traversing the fifth path 90 may start before melted material in the second portion 32 at the junction 74 solidifies. In such an exemplary embodiment there is no remelting of the material of the cladding layer 10 at the junction 74.

A sixth path 94 may start a sixth path initiation point 96 and the energy beam traverses a melt pool along the sixth path 94 to form more of the pressure side wall 16 and then the third rib section 28, after which it meets the melt pool that traversed the fifth path 90. It is possible that cladding material in the portion 78 of the suction side wall 18 adjacent the sixth path initiation point 96 will have solidified. Consequently, it is possible that there may be some remelt at the sixth path initiation point 96.

The melt pool that traverses the fifth path 90 may be timed to meet with the melt pool that traverses the sixth path 94 such that they unite into a single melt pool at the junction 92 where the suction side wall 18 meets the third rib section 28, which avoids remelt of the cladding material at the junction 92. To accomplish this, the start times for the melt pool that traverses the fifth path 90 may be delayed with respect to the melt pool that traverses the sixth path 94. Alternately, the traversal rates may be varied, or the energy beam may maintain the same traversal rates but spend more time on the sixth path 94. An optional, disposable runoff tab 52 may be positioned at the junction 92 and one or more melt pools may be run off at the runoff tab 52. Consequently, in this exemplary embodiment there is only one remelt in the third portion 34 for the second rib section 26.

At this point in the process the third portion 34 of the cladding layer 10 is formed. The fifth path 90 formed a portion 98 of the suction side wall 18. The sixth path 94 formed a portion 100 of the pressure side wall 16 and the third rib section 28.

To form the fourth portion 36, a seventh path 110 may start at the junction 92 where the suction side wall 18 meets the third rib section 28. The energy beam causes a melt pool to form more of the suction side wall 18 until it reaches a seventh path termination point 114. In an exemplary embodiment the melt pool formed by the energy beam traversing the seventh path 110 may start before melted material in the third portion 34 adjacent the junction 92 solidifies. In such an exemplary embodiment there is no remelting of the material of the cladding layer 10 at the junction 92.

An eighth path 116 may start at an eighth path initiation point 118 and the energy beam traverses a melt pool along the eighth path 116 to form more of the pressure side wall 16 until it reaches an eighth path termination point 120. It is possible that cladding material in the portion 100 of the pressure side wall 16 adjacent the eighth path initiation point 118 will have solidified. Consequently, it is possible that there will be some remelt at the eighth path initiation point 118. The seventh path termination point 114 and the eighth path termination point 120 may be a common termination point 122.

The melt pool that traverses the seventh path 110 may be timed to meet with the melt pool that traverses the eighth path 116 such that they unite into a single melt pool at the common termination point 122, which avoids remelt at the common termination point 122. To accomplish this, the start times for the melt pool that traverses the eighth path 116 may be adjusted to start before or after the melt pool that traverses the seventh path 110. Alternately, the traversal rates may be varied, or the energy beam may maintain the same traversal rates but spend more time on the longer. An optional, disposable runoff tab 52 may be positioned at the common termination point 122 and one or more melt pools may be run off at the runoff tab 52. Consequently, in this exemplary embodiment there is only one remelt in the fourth portion 36 for the third rib section 28.

At this point in the process the fourth portion 36 of the cladding layer 10 is formed, and hence the cladding layer 10 is complete. The seventh path 110 formed a portion 124 of the suction side wall 18 and the eighth path 116 formed a portion 126 of the pressure side wall 16.

In a cladding layer 10 made using the exemplary embodiments described above, there exists no more than one remelt for each rib section. In addition, if the exemplary embodiments disclosed above are used together it is possible that one melt pool is initiated at the second path initiation point 46 and traverses along the second path 44, then the fourth path 76, then the fifth path 90, then the seventh path 110, and reaches the seventh path termination point 114 in one continuous, uninterrupted traversal. During this continuous, uninterrupted traversal the melt pools that traverse the other paths may be initiated and terminated so they form opposite wall sections in parallel with the continuous, uninterrupted melt pool. Forming opposite wall sections simultaneously mitigates airfoil warping, and having a continuous, uninterrupted traversal minimizes remelts.

Formation of the second portion 32 and the third portion 34 can be alternately described as traversing the energy beam to move two melt pools simultaneously along one pair of paths for each additional rib section to be formed in the cladding layer. One path of each pair would be forming a portion of one side wall of the cladding layer between a previously formed rib section and a respective additional rib section as well as the additional rib section. Another path of each pair would be forming a portion of an opposite side wall of the cladding layer between the previously formed rib section and the additional rib section.

For example, to form the second section 32, the pair of paths would be the third path 70 and the fourth path 76. The additional rib section to be formed would be the second rib section 26, and the previously formed rib section would be the first rib section 24. The fourth path 76 would form the portion 80 of the pressure side wall 16 and the second rib section 26. The third path 70 would form the opposite side wall portion, which is the portion 78 of the suction side wall 18

To form the third portion 34, the pair of paths would be the fifth path 90 and the sixth path 94. The additional rib section to be formed would be the third rib section 28, and the previously formed rib section would be the second rib section 26. The sixth path 94 would form the portion 100 of the pressure side wall 16 and the third rib section 28. The fifth path 90 would form the opposite side wall portion, which is the portion 98 of the suction side wall 18.

The exemplary pattern of paths shown is not meant to be limiting. For example, the first rib section 24 may be formed by the second path 44 and the junction moved to the suction side 18. Such alternate exemplary embodiments may be applied for each portion of the cladding layer 10. If a portion is altered in this manner, the initiation point for the immediately adjacent portion to be formed may also be moved to the other side. Any pattern is within the scope of the disclosure, even if more than one initiation point is formed for each rib section. In addition, while three rib sections are shown, more or fewer rib sections may be formed in a cladding layer 10.

Further, the power output of the energy beam may be the same for all paths made to form the cladding layer 10. Alternately, the power output may vary such that there may be as many power settings used as there are paths. For example, the power of the energy beam may be at one level for one of a pair of paths, and at another energy level for the other of the pair of paths. Still further, the power may be adjusted while the energy beam is traversing a path to accommodate varying heat requirements.

If the cladding process generates a layer of slag on the cladding layer it may be removed as the powder material is solidified, or at the completion of the formation of the cladding layer 10.

One or more cladding layers 10 may be deposited on a substrate to create or rebuild an airfoil, in which case the above process may be repeated to form as many cladding layers 10 as are necessary.

Figure 2:
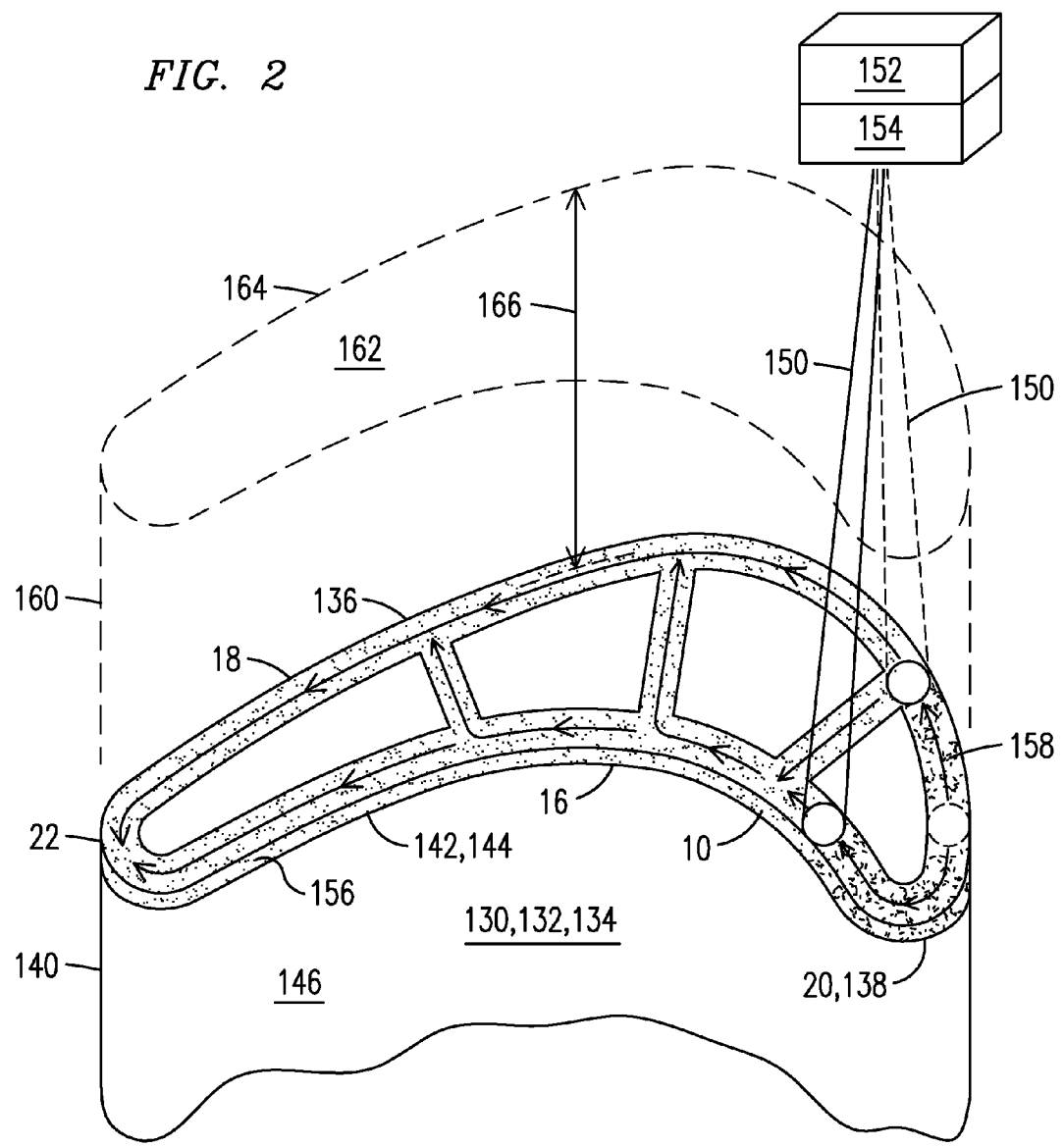
FIG. 2 is a schematic perspective view of the cladding layer of FIG. 1 being formed on the substrate toward a beginning of the formation process.

FIG. 2 is a schematic side view of the cladding layer 10 being formed on the substrate 130 toward a beginning of the formation process. In this exemplary embodiment the substrate is an airfoil 132 having an airfoil pressure side 134, an airfoil suction side 136, an airfoil leading edge 138, an airfoil trailing edge 140, and a bonding surface 142, which is, in this exemplary embodiment, an edge 144 of an airfoil skin 146.

An energy beam 150 emanating from an energy beam source 152 and guided by scanning optics 154 is processing powder material 156 placed on the bonding surface 142. It can be seen that the scanning optics 154 are able to direct the energy beam 150 toward one side of the cladding layer 10 as indicated by a solid energy beam line, and then to the other side of the cladding layer, as indicated by the dotted line. The scanning optics are capable of jumping the beam from one side to the other at a jump rate of approximately 3 m/s. Consequently, two melt pools can be sustained and traversed simultaneously. During the process the powder material 156 melts, solidifies, and bonds to the bonding surface 142 to form the cladding layer 10.

In an exemplary embodiment where a flux powder is incorporated into the powder material 156 a slag 158 may form on the cladding layer 10, which is removed before any subsequent cladding layers are deposited. In alternate exemplary embodiments the filler and flux could be preplaced in a distinct preform such as encapsulated in a sleeve that is then positioned at the process location. The filler material in the powder material may have the same chemical composition as the substrate or it may be different.

A dotted line defines a finished profile 160 of an unfinished portion 162 of the airfoil 132 when sufficient cladding layers 10 are deposited to complete the airfoil 132. (Ribs are not externally visible in a finished airfoil.) The finished profile 160 may represent an airfoil 132 that is being created for the first time, or it may indicate material that was previously part of the airfoil 132 but which was removed and which must be replaced to return the airfoil 132 to its original condition. The latter may occur, for example, when an airfoil 132 that has been in service experiences cracking at a tip 164 of the airfoil 132. The airfoil 132 may be pulled from service and a tip end 166 and the unwanted cracks therein are removed (thereby creating the edge 144) to permit the cladding repair operation disclosed herein. In a non limiting example, 30 mm may be removed and cladding layers of 3 mm thickness may be formed until the 30 mm section is rebuilt. When ten layers are deposited the airfoil 132 would be returned to a finished state. An outer surface of the airfoil 132 may require finish machining. An inner surface may be accepted as is.

FIG. 3 is a schematic side view of the cladding layer 10 disposed on an alternate substrate which may be, for example, a blade platform 170. This may occur when an entire airfoil is removed from a blade and the airfoil is to be replaced using the methods disclosed herein. Alternately, this may occur when a new blade is to be manufactured and the airfoil portion is to be applied to a new blade platform 170 using the methods disclosed herein.

FIG. 4 schematically shows an exemplary embodiment of patterns followed by the energy beam when forming the cladding layer 10. In this view the patterns are superimposed on the cladding layer 10. In this exemplary embodiment the energy beam is guided in a circular pattern 180. A thickness 182 of the airfoil skin 146, and hence the cladding layer 10 may be 3.0 mm. A diameter 184 of the circular pattern may be 3.5-4.0 mm and adjacent circular patterns 180 may overlap by approximately 1 mm as the energy beam traverses the first path 40 and the second path 44. The energy beam may have, for example, a 1 mm diameter. In this exemplary embodiment the first rib section 24 is formed by traversing the energy beam from the portion 60 of the suction side wall 18 of the cladding layer 10 to the portion 62 of the pressure side wall 16. The circular patterns 180 may merge at the junction 50 where the first rib section 24 meets the pressure side wall 16, or one of the circular patterns 180 may stop while the other circular pattern 180 finishes. Alternately, the beam pattern at this location may be tailored to form other shapes most conducive to formation of the junction 50. Parameters such as the amount of power and/or traversal rate etc may be added at the junction 50 to optimize bonding. Optionally, one or both of the circular patterns may run off at the optional runoff tab 52. The dimensions provided are non limiting examples and the dimensions and pattern may be adjusted in ways known to those of ordinary skill in the art.

In a variation shown in FIG. 5, the energy beam may form the first rib section 24 in a different manner. Instead of traversing the melt pool from the portion 60 of the suction side wall 18 of the cladding layer 10 to the portion 62 of the pressure side wall 16, the energy beam widens the melt pool so that it includes the first rib section 24 while it continues along the portion 60 of the suction side wall 18. This may require significant power, for example, 8-10 kW, but may expedite production where possible. Here again the exemplary embodiment is not meant to be limiting. The exact patterning may be tailored in ways known to those of ordinary skill in the art. For example, the scanning optics 154 may maintain an overlapping pattern but may make the pattern oval enough to span from the pressure side wall 16 to the suction side wall 18.

FIG. 6 schematically shows an exemplary embodiment of a pattern followed by the energy beam while forming an exemplary embodiment of a tip cap 186 of the airfoil 132, which may be necessary to complete the airfoil 132. An interior of the airfoil 132 may be filled with a ceramic material (e.g. zirconia, silica, alumina, titania, graphite etc) in powder or solid form and the ceramic material may be positioned to surround an exterior of the airfoil 132. The powder material 156 is positioned on the ceramic material that fills the airfoil 132. In an exemplary embodiment the energy beam traverses a circular pattern 180 back and forth between the airfoil pressure side 134 and the airfoil suction side 136. Once the tip cap 186 is complete the ceramic material may be removed, leaving a completed airfoil 132. This exemplary embodiment is not meant to be limiting. The exact patterning may be tailored in ways known to those of ordinary skill in the art.

In a variation shown in FIG. 7, the energy beam may form the tip cap 186 in a different manner. Instead of forming distinct lateral deposits, the energy beam may be widened so that the melt pool travels from the airfoil leading edge 138 to the airfoil trailing edge 140. This may require significant power, for example, 8-10 kW, but may expedite production where possible. This exemplary embodiment is not meant to be limiting and other patterns may be used, similar to the overlapping, wide oval patterns that span from the airfoil pressure side 134 to the airfoil suction side 136 disclosed above.

Figure 8:
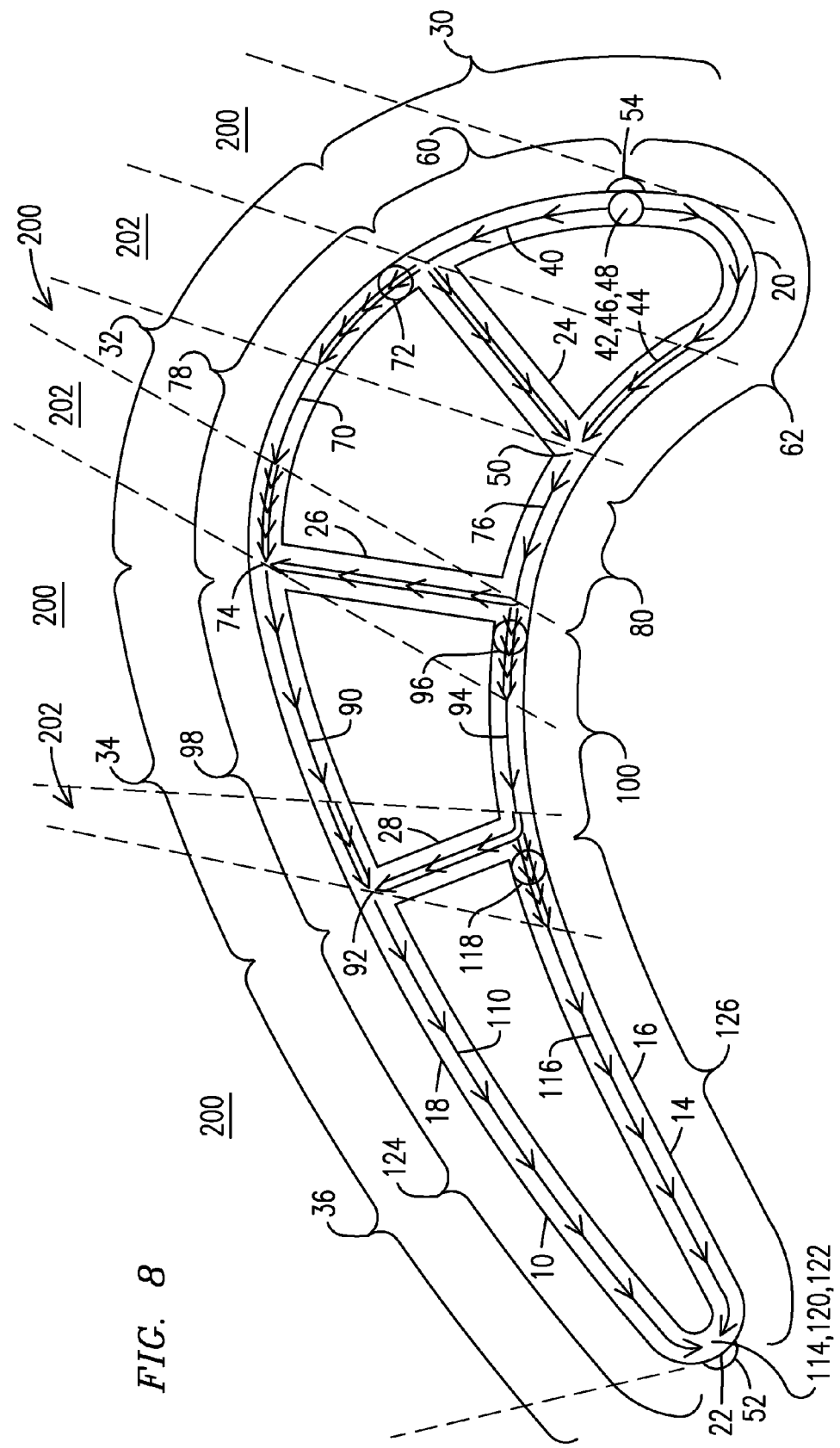
FIG. 8 schematically shows an exemplary embodiment of paths followed by an energy beam when forming an alternate exemplary embodiment of the cladding layer, where the paths are superimposed on the cladding layer.

In another exemplary embodiment shown in FIG. 8, it is possible to form the cladding layer 10 with no remelts. In this exemplary embodiment the beam sharing previously used to maintain two melt paths would be used to maintain three melt paths when, for example, a rib section is encountered. In this exemplary embodiment formation of the cladding layer 10 may include two-melt-pool regions 200 and three melt-pool-regions 202. Instead of delaying the start of a subsequent path until two melt pools meet, a melt pool is initiated on a subsequent path while the molten material adjacent the respective initiation point is still molten.

This may be accomplished by sharing the energy beam still further to form a third melt pool that starts as the molten material adjacent the respective initiation point is melted, or soon enough there after such that the molten material is still molten when energy beam forms the third melt pool. As a result, as before, the cladding layer 10 may be still considered to include the first portion 30 that includes the first rib section 24, the second portion 32 that includes the second rib section 26, the third portion 34 that includes the third rib section 28, and the fourth portion 36 that includes the trailing edge 22. As before, a pair of paths/melt pools may be used to form each portion of the cladding layer 10. However, unlike before, the third melt pool starts to traverse a subsequent portion as two melt pools finish the portion ahead of the subsequent portion. For example, while the two melt pools form the first rib section 24 of the first portion 30 and the portion 62 of the pressure side wall 16, a third melt pool has already begun to traverse along the third path 70 of the second portion 32, and has begun this process before molten material adjacent the third path initiation point 72 has solidified. This prevents any remelt at this location.

The two melt pools still forming the first portion 32 may be timed to reach the junction 50 where the first rib section 24 meets the pressure side wall 16 at the same time. At this point the energy beam forms a single melt pool and begins to traverse it along the fourth path 76 while the melt pool continues to form the third path 70. Thus, during this process, there may only be two melt pools simultaneously forming one portion 30, 32, 34 because the third melt pool may be forming a subsequent portion 32, 34, 36. Once the section before the subsequent section is formed the formation reverts to two melt pools until another rib section is encountered by one of the melt pools.

The traversal rate of the melt pools may be adjusted to account for the relative lengths of the paths and provide for properly timing the arrival of two melt pools at the respective junctions simultaneously. For example, when forming the second portion 32, a melt pool begins to form the portion 80 of the pressure side wall 16 only after another melt pool has already begun to form the portion 78 of the suction side wall 18. If there remains a longer traversal for the melt pool on the fourth path than the melt pool on the third path 70, then the melt pool on the third path 70 may be slowed relatively so that both melt pools reach the junction 74 where the suction side wall 18 meets the second rib section 26 simultaneously. Alternately, the speed of the melt pool forming the fourth path 76 may be increased relatively.

When the melt pool forming the fourth path 76 reaches the second rib section 26 a third melt pool is initiated at the sixth path initiation point 96. This may occur before molten material adjacent the sixth path initiation point 96 has solidified, thereby preventing remelt at this location. As the two melt pools traverse the second rib section 26 and the portion 78 of the suction side wall 18, the third melt pool begins to traverse the portion 100 of the pressure side wall 16. Once the melt pools forming the second rib section 26 and the portion 78 of the suction side wall 18 meet at the junction 74, a single melt pool then begins to traverse the portion 98 of the suction side wall 18. Here again traversal rates for the melt pools taking the fifth path 90 and the sixth path 94 may be timed so they reach the junction 92 where the suction side wall 18 meets the third rib section 28 simultaneously. For example, the third melt pool may initially be slowed relatively, as indicated by a shorter space between arrowheads.

When the melt pool forming the sixth path 94 reaches the third rib section 28 the energy beam creates a third melt pool at the eighth path initiation point 118. This may occur before molten material adjacent the eighth path initiation point 118 has solidified, thereby preventing remelt at this location. As the two melt pools traverse the third rib section 28 and the portion 98 of the suction side wall 18, the third melt pool begins to traverse the portion 126 of the pressure side wall 16. Once the melt pools forming the third rib section 28 and the portion 98 of the suction side wall 18 meet, a single melt pool then begins to traverse the portion 124 of the suction side wall 18. Traversal rates for the melt pools taking the seventh path 110 and the eighth path 116 may be timed so they reach the common termination point 122 simultaneously.

Advantageously, in this exemplary embodiment the entire cladding layer 10 is formed with no remelts.

Figure 9:
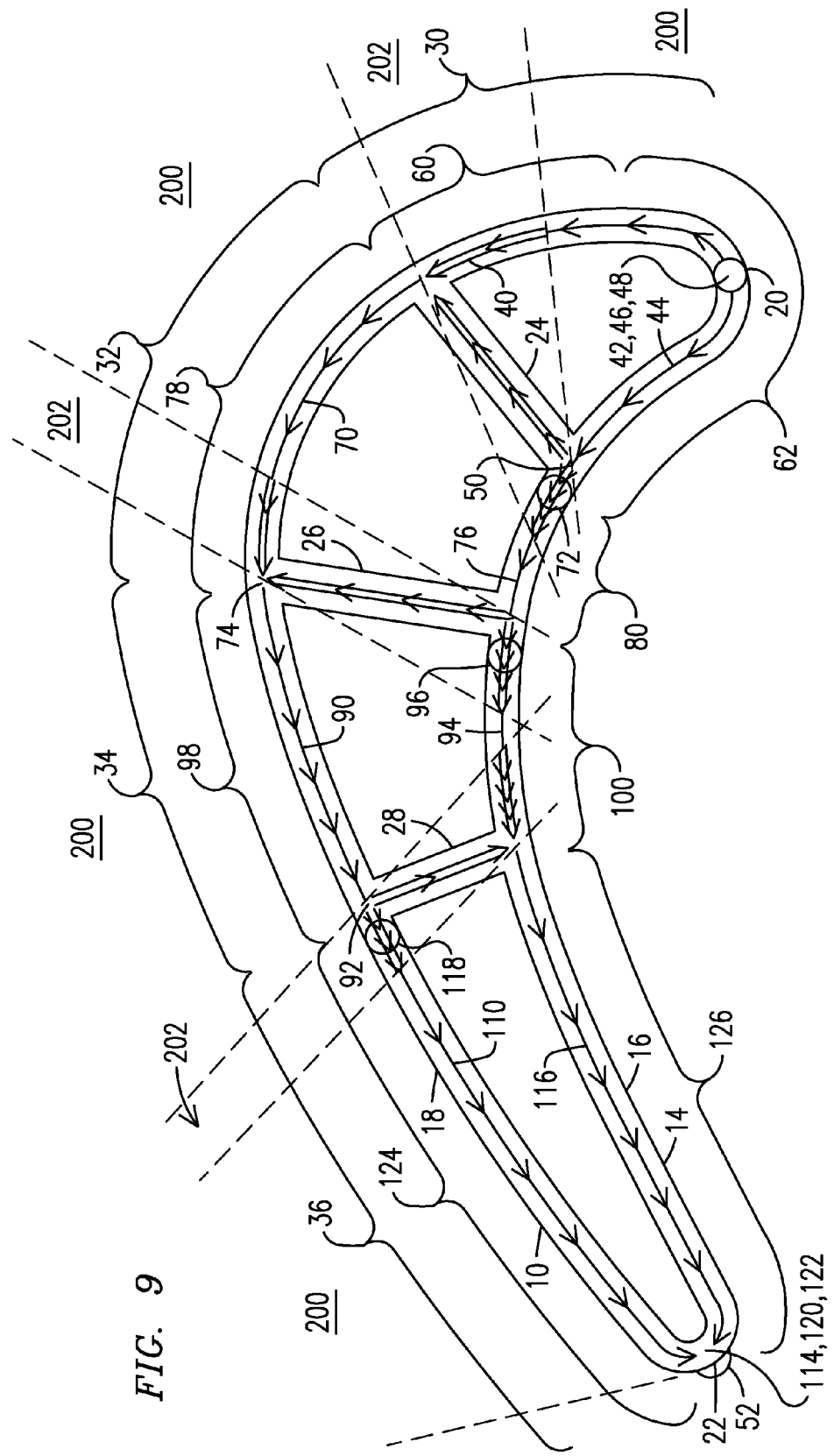
FIG. 9 schematically shows an exemplary embodiment of paths followed by an energy beam when forming an alternate exemplary embodiment of the cladding layer, where the paths are superimposed on the cladding layer.

The exemplary pattern of paths shown is not meant to be limiting. For example, in an alternate exemplary embodiment shown in FIG. 9, the third melt pool begins to traverse the fourth path 76 when the melt pool traversing the second path 44 arrives at the first rib section 24. As in the exemplary embodiment of FIG. 8, when the melt pool traversing the fourth path 76 arrives at the second rib section 26 the third melt pool begins to traverse the sixth path 94. However, when the melt pool traversing the fifth path 90 reaches the third rib section 28 a third melt pool begins to traverse the seventh path 110.

So long as the third melt pools originate from, are formed contiguous to, or join previously processed (melted) but not yet solidified material, remelt can be avoided. In other words, so long as the third melt pools begin to traverse at a time when adjacent material in the previously processed rib section is still molten, remelt can be avoided. Any and all of these ways of avoiding remelt are considered to be within the scope of this disclosure.

As above, the power output of the energy beam may be the same for all paths made to form the cladding layer 10. Alternately, the power output may vary such that there may be as many power settings used as there are paths. For example, the power of the energy beam may be at one level for one of a pair of paths, and at another energy level for the other of the pair of paths. Still further, the power may be adjusted while the energy beam is traversing a path to accommodate varying heat requirements.

From the foregoing it can be seen that the inventors have devised an innovative method for building up an airfoil in a manner not previously possible. Consequently, this represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method, comprising:
providing a layer of powder material on a substrate; and
traversing an energy beam across the layer of powder material to form a cladding layer, wherein the cladding layer forms a layer of an airfoil, the traversing comprising:
starting a first path and a second path of traversal of the energy beam from a common initiation point;
forming a portion of a first side wall of the cladding layer and a first rib section by traversing the energy beam along the first path and concurrently forming a portion of a second side wall of the cladding layer by traversing the energy beam along the second path; and
creating not more than one initiation point for each rib section in the cladding layer;
further comprising removing at least a portion of an airfoil from an existing component, thereby forming the substrate;
forming the first rib section as part of the first path by widening the energy beam to span at least from the first side wall to the second side wall and traversing the energy beam along a short dimension of the first rib section; and
starting a third path of traversal of the energy beam on the first side wall abutting the first rib section.

2. A method, comprising:
providing a layer of powder material on a substrate; and
traversing an energy beam across the layer of powder material to form a cladding layer, wherein the cladding layer forms a layer of an airfoil, the traversing comprising:
starting a first path and a second path of traversal of the energy beam from a common initiation point;
forming a portion of a first side wall of the cladding layer and a first rib section by traversing the energy beam along the first path and concurrently forming a portion of a second side wall of the cladding layer by traversing the energy beam along the second path; and creating not more than one initiation point for each rib section in the cladding layer;

further comprising removing at least a portion of an airfoil from an existing component, thereby forming the substrate;

forming the first rib section as part of the first path by traversing the energy beam from the first side wall to the second side wall;

uniting the first path and the second path at a junction of the first rib section and the second side wall; and starting a third path of traversal of the energy beam on the first side wall abutting the first rib section.

3. The method of claim 2, further comprising starting the third path of traversal when adjacent first path material is molten, thereby preventing remelt at a third path initiation point.

4. The method of claim 2, further comprising:

starting a fourth path of traversal of the energy beam at the junction of the first rib section and the second side wall to form more of the second side wall and then a second rib section, the second rib section formed by traversing the energy beam from the second side wall to the first side wall;

forming more of the first side wall with the third path and then uniting the third path with the fourth path at a junction of the second rib section and the first side wall; and starting a sixth path of traversal of the energy beam on the second side wall abutting the second rib section.

5. The method of claim 4, further comprising starting the sixth path of traversal when adjacent fourth path material is molten, thereby preventing remelt at a sixth path initiation point.

6. The method of claim 4, further comprising initiating the fourth path in a manner effective to prevent remelt of the cladding layer at the junction of the first rib section and the second side wall.

7. A method, comprising:

providing a layer of powder material on a substrate; and traversing an energy beam across the layer of powder material to form a cladding layer, wherein the cladding layer forms a layer of an airfoil, the traversing comprising:

starting a first path and a second path of traversal of the energy beam from a common initiation point;

forming a portion of a first side wall of the cladding layer and a first rib section by traversing the energy beam along the first path and concurrently forming a portion of a second side wall of the cladding layer by traversing the energy beam along the second path; and creating not more than one initiation point for each rib section in the cladding layer;

further comprising initiating the first path and the second path in a manner effective to prevent remelt of the cladding layer at the common initiation point.

8. The method of claim 7, further comprising terminating the first path and the second path at a junction of the first path and the second path and in a manner effective to prevent remelt of the cladding layer at the junction of the first path and the second path.

9. The method of claim 7, further comprising maintaining a same power output of the energy beam when traversing the first path as when traversing the second path.

10. A method, comprising:

providing a layer of powder material on a substrate;

forming an initial melt pool at an initiation point in the layer of powder material with an energy beam;

traversing the energy beam to move a first melt pool along a first path from the initial melt pool while simultaneously moving a second melt pool along a second path from the initial melt pool;

uniting the first melt pool and the second melt pool at a junction, wherein the first path forms part of a first side wall and a rib section of a cladding layer, wherein the second path forms part of a second side wall of the cladding layer, wherein the cladding layer forms a layer of an airfoil, and wherein the junction is where the rib section meets the second side wall; and traversing the energy beam to move two melt pools simultaneously along one pair of paths for each additional rib section to be formed in the cladding layer, one path of each pair forming a portion of one side wall of the cladding layer between a previously processed rib section and a respective additional rib section as well as the additional rib section, and another path of each pair forming a portion of an opposite side wall of the cladding layer between the previously processed rib section and the additional rib section.

11. The method of claim 10, further comprising forming only one initiation point for each pair of paths that form one additional rib section.

12. The method of claim 10, further comprising timing a start of the traversal of the two melt pools used to form each additional rib section such that each melt pool starts when adjacent material in the previously processed rib section is still molten.

13. The method of claim 10, further comprising uniting two melt pools that form one additional rib section at a junction where the additional rib section and the opposite side wall meet.

14. The method of claim 13, further comprising removing at least a portion of an airfoil from an existing component, thereby forming the substrate.

15. The method of claim 10, further comprising maintaining at least one melt pool that moves continuously from the initial melt pool until the cladding layer is complete.

16. The method of claim 10, further comprising adjusting a power output of the energy beam when traversing the energy beam.

17. The method of claim 10, wherein the substrate comprises a superalloy.

18. The method of claim 7, wherein the substrate comprises a blade platform, the method further comprising depositing a first cladding layer onto the blade platform.

19. The method of claim 7, further comprising removing at least a portion of an airfoil from an existing component, thereby forming the substrate.

* * * * *